United States Patent [19]

Schwefel

[11] Patent Number: 4,575,791

[45] Date of Patent: Mar. 11, 1986

[54] METHOD FOR RESTARTING A TOOL ONTO A WORKPIECE CONTOUR

[75] Inventor: Ernst Schwefel, Traunreut, Fed. Rep. of Germany

[73] Assignee: Johannes Heidenhain GmbH, Traunreut, Fed. Rep. of Germany

[21] Appl. No.: 591,429

[22] Filed: Mar. 20, 1984

[30] Foreign Application Priority Data

Mar. 26, 1983 [DE] Fed. Rep. of Germany ....... 3311119

[51] Int. Cl.<sup>4</sup> ...................... G05B 19/18; G05B 19/41; G06F 15/46
[52] U.S. Cl. .................................. 364/168; 364/171; 364/180; 364/474; 318/570; 318/590
[58] Field of Search ............................. 364/167-168, 364/171, 180-181, 184, 188-190, 192; 318/567-570, 574, 590-591, 600-601

[56] References Cited

U.S. PATENT DOCUMENTS

| | | | |
|---|---|---|---|
| 3,970,830 | 7/1976 | White et al. | 364/168 X |
| 4,055,787 | 10/1977 | Beadle et al. | 318/591 |
| 4,334,272 | 6/1982 | Imazeki et al. | 364/474 |
| 4,356,552 | 10/1982 | Imazeki et al. | 364/474 |
| 4,386,408 | 5/1983 | Imazeki et al. | 364/474 |
| 4,404,507 | 9/1983 | Dean et al. | 318/570 |
| 4,442,493 | 4/1984 | Wakai et al. | 364/475 |
| 4,519,026 | 5/1985 | Nozawa et al. | 364/167 |
| 4,521,860 | 6/1985 | Kanematsu et al. | 364/474 |

*Primary Examiner*—Gary V. Harkcom
*Attorney, Agent, or Firm*—Willian Brinks Olds Hofer Gilson & Lione Ltd.

[57] ABSTRACT

A method for restarting a tool on a workpiece contour in a numerically controlled processing machine of the type having a display unit for alphanumerical and/or graphical representation of processing information. After a program interruption, the program is executed anew in a control mode without machine movement from a predetermined starting point, and the resulting workpiece contour is continuously, graphically represented on the display unit. The operator utilizes this graphic display to determine an end point of the control mode program execution. The machine is then transferred into its axial positions and its function state to the program state of the end point, and the processing program with machine movements is continued from this end point, thereby starting the tool onto the desired tool path.

4 Claims, 2 Drawing Figures

METHOD FOR RESTARTING A TOOL ONTO A WORKPIECE CONTOUR

BACKGROUND OF THE INVENTION

This invention relates to a process for restarting a tool onto a workpiece contour after a program interruption. This invention is particularly directed for use with a numerically controlled processing machine of the type which comprises a controller, a display unit for graphically representing processing information, and means for storing a plurality of program sets which combine to form a processing program, each program set representing a respective contour section of the workpiece contour to be produced.

German Pat. DE-PS No. 26 42 453 discloses a process for restarting a changed tool from a defined position onto a workpiece after a program interruption in a computer-controlled machine tool. The program is restarted with new tool correction values from a proscribed starting point and is executed in a control mode, without machine movement, up to an end point to which is allocated a corrected starting point for the tool. The tool is thereupon automatically driven back on a path between the defined position and the corrected starting point.

This process, however, presents the disadvantage that it is in general difficult to determine an appropriate end point, especially in the case of complicated programs that present, for example, several subprogram sets or program partial repetitions.

SUMMARY OF THE INVENTION

The present invention is directed to an improved method for restarting a tool onto a workpiece contour of the general type mentioned initially above, in which the restarting of the tool onto the workpiece contour after program interruption is substantially simplified.

According to this invention, after a program interruption, the processing program is restarted in a control mode, without machine movement, from a selected beginning point. A graphical representation of either the workpiece contour or the tool path as it is progressively generated by the controller during the execution of the processing program in the control mode is displayed on the display unit. An operator then manually determines with the aid of the graphical representation a suitable end point of the control mode execution of the processing program, to which end point is allocated a starting point for the tool onto the workpiece contour. Then the function state and the tool axial position state of the machine are made to correspond to values associated with the previously selected end point of the control mode execution of the processing program. Finally, execution of the processing program is continued from the end point of the control mode execution, with the controller in a processing mode in which the controller commands machine movement in accordance with the processing program to cause the tool to restart onto the workpiece contour.

This invention provides the important advantages that, regardless of the degree of complication of the workpiece contour or the processing program, the determination of the end point of the control mode execution of the processing program may be determined readily. For this reason, the tool can be restarted onto the workpiece contour without time delay, and down time of the processing machine as a result of program interruptions can be substantially reduced. Further advantageous aspects of the invention are set forth in the dependent claims.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
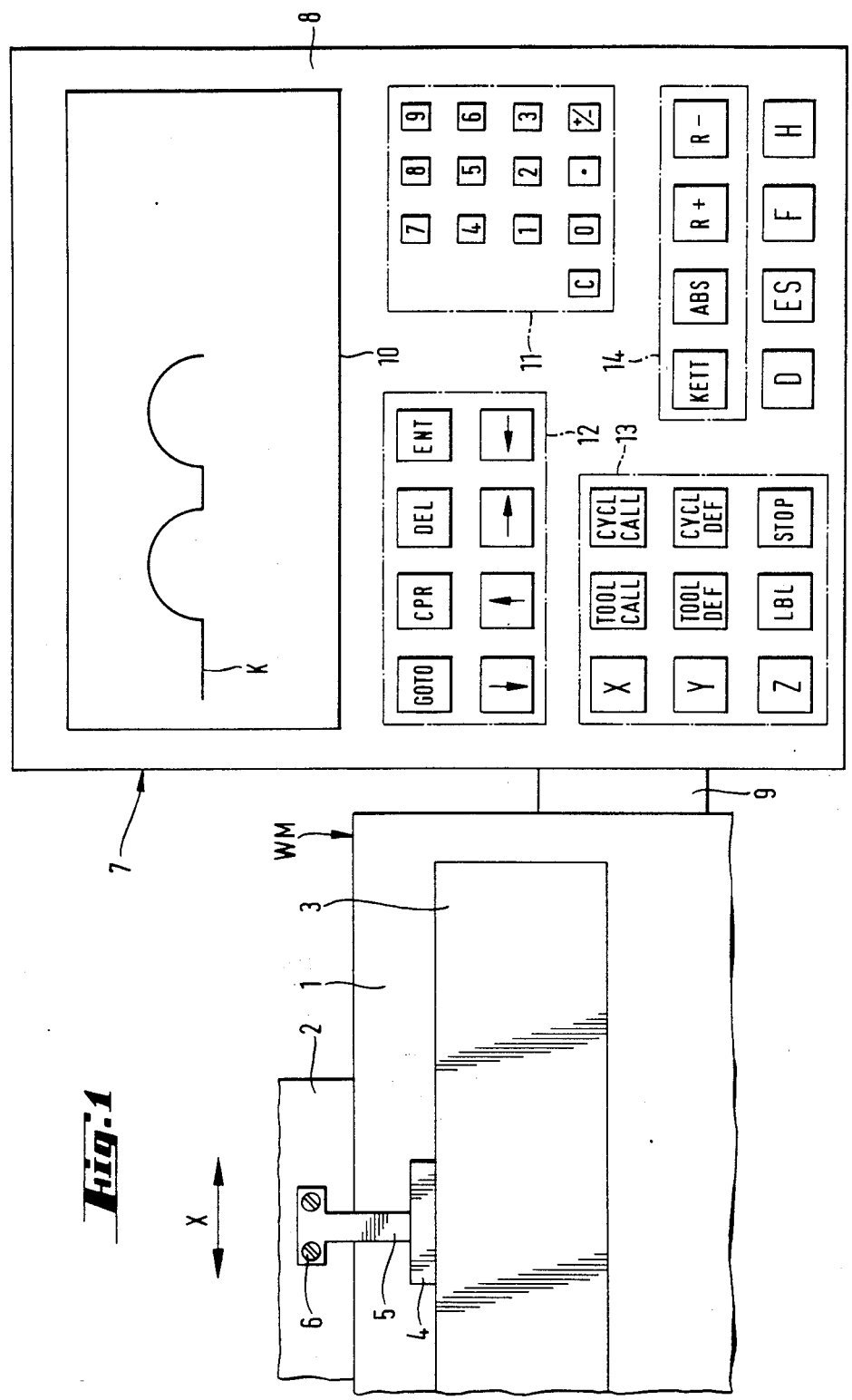
FIG. 1 is a schematic fragmentary view of a processing machine which incorporates a numerical control system suitable for use with the method of this invention.

Turning now to the drawings, FIG. 1 shows portions of a numerically controlled processing machine which includes a bed 1 and a slide piece 2 which is slideable in the X direction (X axis). This processing machine can be any suitable numerically controlled machine WM, such as for example a milling or shaping machine. Relative movement between the bed 1 and the slide piece 2 is measured by a digital electric length measuring device which includes a graduated scale mounted on a scale carrier 3, which scale is scanned in a known manner by a scanning unit 4. The scanning unit 4 is connected with the slide piece 2 by means of a coupling member 5 and a screw connection 6. The scale carrier 3 is carried to the bed 1 of the machine tool. Elements of the machine tool WM for the Y axis and the Z axis are not shown.

For the numerical control of the machine tool WM, a numerical program control system with a control panel is fastened by means of a swinging arm 9 to the bed 1 of the machine tool WM. This control panel includes a graphical display unit 10 for displaying alphanumerical representations of program sets S for the processing program and/or for displaying graphic representations of workpiece contours K to be made according to this processing program and/or tool paths K',K'' commanded by the processing program. Input keys 11 are provided for inputting numerical data to define the several program sets used to form the processing program. This input data is represented for checking purposes on the display unit 10. In addition, in a known manner, the control panel includes several control keys such as program set commencement keys 13 and preselection keys 14 to define the type of operation. The display unit 10 also serves to display the respective actual position values of the tool W in the X, Y and Z axes while processing is taking place.

Figure 2:
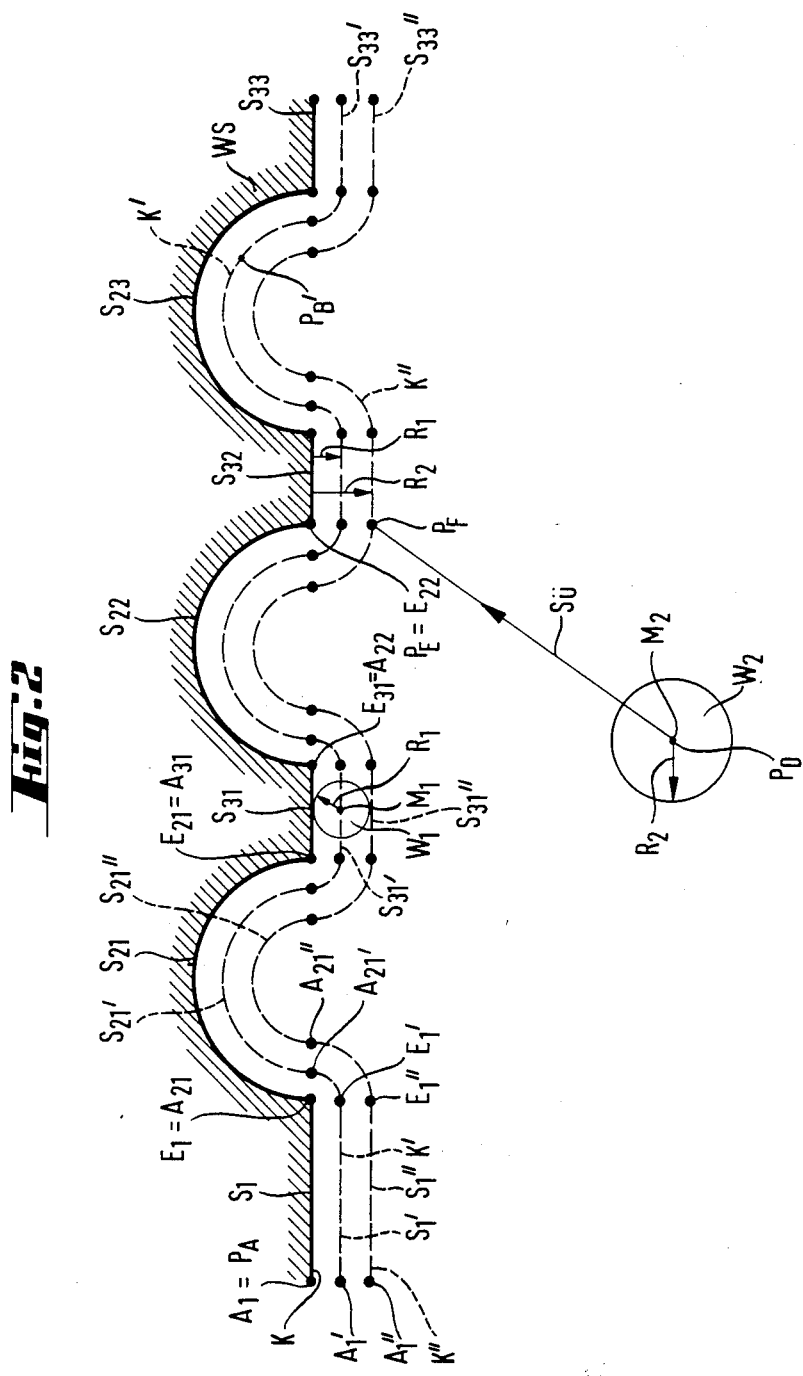
FIG. 2 is a schematic representation of a workpiece contour produced with the processing machine of FIG. 1.

The processing program set up by means of the keys 11–14 for a contour K to be produced on a workpiece WS is made up of several individual program sets which are stored in the program control system 7. FIG. 2 shows by way of example a workpiece contour K made up of three individual program sets $S_1,S_2,S_3$. In this illustrative example, the program sets $S_1,S_3$ represent straight lines having starting points $A_1,A_3$, and end points $E_1,E_3$. In this example the program set $S_2$ represents a semicircle with the starting point $A_2$ and the end point $E_2$. After the program set $S_1$, the program sets $S_2,S_3$ are to be repeated successively three times and are therefore designated as program sets $S_{21}-S_{23}$, $S_{31}-S_{33}$.

The computer included in the program control system 7 executes between the starting points $A_1,A_3$ and the respective end points $E_1,E_3$ of the program sets $S_1,S_3$ a straight line interpolation, and between the starting point $A_2$ and the end point $E_2$ of the program set $S_2$ a circular interpolation. The computer is programmed to calculate from these values with consideration of the tool correction value $R_1$ (indicative of a tool radius equal to $R_1$) of the tool $W_1$ the corrected path $K'$. The center $M_1$ of the tool $W_1$ is commanded to travel along the corrected path $K'$, which is established by the corresponding program sets $S_1',S_2',S_3'$. Corrected points $A',E'$ on the corrected path $K'$ are associated with respective points $A,E$ on the workpiece contour $K$.

During the processing of the workpiece contour $K$, the center $M_1$ of the tool $W_1$ travels along the corrected path $K'$. For purposes of illustration, it will be assumed that during the subprogram set $S_{23}$ at the point $P_B'$ of the corrected path $K'$ the tool $W_1$ breaks. At this point the program is interrupted and the broken tool $W_1$ is driven to a tool change position. After the tool has been changed, the new tool $W_2$ having a radius $R_2$ is brought manually to a defined point $P_D$. In order to bring the new tool $W_2$ from this defined point $P_D$ again onto the workpiece contour $K$, the processing program is executed anew in a control mode in which tool movement is calculated but the tool $W_2$ is not moved. During this renewed execution of the processing program, a new tool correction value $R_2$ is utilized, and the processing program is executed from a predetermined starting point $P_A$. For example, this predetermined starting point $P_A$ can be the starting point $A_1$ of the program set $S_1$. By means of the input keys 11 on the control panel 8 the program set number of the program set $S_1$ and the new tool correction value $R_2$ are keyed in. The key D is then depressed to commence execution of the processing program, taking into account the new tool correction value $R_2$ in order to generate new program sets $S_1'',S_2'',S_3''$ for the corrected tool path $K''$. This corrected tool path $K''$ is calculated for the center point $M_2$ of the new tool $W_2$.

In order to determine the end point $P_E$ of this execution of the processing program, and thereby the associated starting point $P_F$ on the corrected path $K''$ for the center point $M_2$ of the new tool $W_2$, the control system 7 displays continuously on the display unit 10 a graphical representation of the workpiece contour $K$ resulting with this program execution. This contour $K$ gradually and progressively is traced out on the display unit 10 (from left to right in this example) as the control mode execution of the processing program progresses. The machine operator, possibly by comparing the already processed contour $K$ of the workpiece WS, can determine the end point $P_E$ of this control mode execution of the processing program purely visually with the aid of the graphic representation of the resulting workpiece contour $K$ by operating a stop key H. The operator does not need to know anything about the structure of the program, and he does not have to take into account any numerical definition of positions or program sets of the processing program. For example, the control system 7 can be programmed to gradually and progressively trace out the contour $K$ which will be formed by the new workpiece $W_2$ as it executes the processing program made up of the program sets $S_1'',S_2'',S_3''$. This graphical representation is watched by the operator, who depresses the stop key when the graphical representation of the contour reaches a point suitable for use as an end point $P_E$. For example, this end point $P_E$ can be the end point $E_{22}$ of the program set $S_{22}$. A starting point $P_F$ on the corrected path $K''$ for the center point $M_2$ of the new tool $W_2$ is associated with this end point $P_E$. In an alternate embodiment, the execution of the program in the control mode can occur in a program set manner in which individual program sets are executed sequentially in the proper order when an individual set key ES is depressed by the operator. In this alternate embodiment, a first depression of the key ES would cause the (control mode) execution of program set $S_1$ and a tracing of the resulting contour $K$ up to point $E_1$ on the display unit 10. A second depression of the key ES would cause the program set $S_{21}$ to be executed and the contour $K$ to be traced up to the end of set $S_{21}$, and so forth. In this way, the operator can reach the desired end point $P_E$.

The control key F on the control panel 8 is used to bring the machine tool WM both in its axial tool position and its function state to the program state of the end point $P_E$ of the control mode process program execution. Thereafter, a transition set $S_U$ is calculated between the points $P_D$ and $P_F$ for the center point $M_2$ of the tool $W_2$. This transition set $S_U$ can be for example in the form of a straight line. The transition set $S_U$ is used to drive the new tool $W_2$ to the workpiece contour $K$ so that the interrupted processing program can be continued with automatically controlled movement of the machine tool $W_2$.

Of course, it should be understood that a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of this invention.

I claim:

1. A process for restarting a tool onto a workpiece contour after a program interruption, in a numerically controlled processing machine of the type comprising a controller, a display unit for graphically representing processing information, and means for storing a plurality of program sets which combine to form a processing program, each program set representing a respective contour section of the workpiece contour to be produced, wherein the machine is characterized by a function state and a tool axial position state, said process comprising the following steps:
   (a) after a program interruption, restarting the processing program in a control mode, without machine movement, from a selected beginning point;
   (b) displaying a graphical representation on the display unit of one of (1) a workpiece contour and (2) a tool path generated by the controller during execution of the processing program in the control mode;
   (c) manually determining with the aid of the graphical representation of step (b) an end point of the control mode execution of the processing program to which is allocated a starting point for the tool onto the workpiece contour;
   (d) causing the function state and the tool axial position state of the machine to correspond to values associated with the end point of the control mode execution of the processing program; and (e) continuing execution of the processing program from the end point of the control mode execution, with the controller in a processing mode in which the controller commands machine movement in accordance with the processing program to cause the tool to restart onto the workpiece contour.

2. The method of claim 1 wherein the graphical representation is displayed in step (b) in a stepwise fashion, each step corresponding to a respective one of the program sets.

3. The method of claim 1 wherein the graphical representation is displayed continuously and progressively in step (b), and wherein the end point is manually determined in step (c) by means of a stop command.

4. The method of claim 1 wherein the starting point for the tool is determined in accordance with a tool correction value entered into the controller prior to step (d).

* * * * *